(12) United States Patent
Nakazawa et al.

(10) Patent No.: US 11,549,238 B2
(45) Date of Patent: Jan. 10, 2023

(54) SYSTEM AND METHOD FOR WORK MACHINE

(71) Applicant: KOMATSU LTD., Tokyo (JP)

(72) Inventors: Koichi Nakazawa, Tokyo (JP); Osamu Yatsuda, Tokyo (JP)

(73) Assignee: KOMATSU LTD., Tokyo (JP)

(*) Notice: Subject to any disclaimer, the term of this patent is extended or adjusted under 35 U.S.C. 154(b) by 4 days.

(21) Appl. No.: 17/289,676

(22) PCT Filed: Jan. 20, 2020

(86) PCT No.: PCT/JP2020/001721
§ 371 (c)(1),
(2) Date: Apr. 28, 2021

(87) PCT Pub. No.: WO2020/153300
PCT Pub. Date: Jul. 30, 2020

(65) Prior Publication Data
US 2021/0404151 A1 Dec. 30, 2021

(30) Foreign Application Priority Data
Jan. 23, 2019 (JP) .............................. JP2019-008905

(51) Int. Cl.
*E02F 9/26* (2006.01)
*G06V 20/56* (2022.01)
*B60R 11/04* (2006.01)

(52) U.S. Cl.
CPC .............. *E02F 9/262* (2013.01); *B60R 11/04* (2013.01); *E02F 9/264* (2013.01); *G06V 20/56* (2022.01);
(Continued)

(58) Field of Classification Search
None
See application file for complete search history.

(56) References Cited

U.S. PATENT DOCUMENTS 5,996,702 A * 12/1999 Hall .................... E02F 9/26
172/4.5
2015/0361642 A1* 12/2015 Stratton ................ E02F 9/205
701/461
(Continued)

FOREIGN PATENT DOCUMENTS

JP 2003-335196 A 11/2003
JP 2014-224412 A 12/2014
(Continued)

OTHER PUBLICATIONS

The International Search Report for the corresponding international application No. PCT/JP2020/001721, dated Mar. 3, 2020.

*Primary Examiner* — Rebecca A Volentine
(74) *Attorney, Agent, or Firm* — Global IP Counselors, LLP (57) ABSTRACT

A system includes a processor and a display. The processor acquires shape data indicative of a shape of the surroundings in a traveling direction of a work machine. The processor generates a guide line. The guide line is disposed spaced from the work machine. The guide line indicates the shape of the surroundings in the traveling direction of the work machine. The processor synthesizes a surrounding image and the guide line and generates an image including the surroundings image and the guide line. The display displays the image including the surroundings image and the guide line based on a signal from the processor. The system may further include the work machine, a camera that captures the surrounding image, and a sensor that measures the shape of surroundings.

20 Claims, 7 Drawing Sheets

(52) U.S. Cl.
CPC ..... *B60R 2300/305* (2013.01); *B60Y 2200/41* (2013.01)

(56) References Cited

U.S. PATENT DOCUMENTS

| | | |
|---|---|---|
| 2017/0050566 A1 | 2/2017 | Yamashita et al. |
| 2017/0350692 A1* | 12/2017 | Ohtomo .................. G06T 11/60 |
| 2019/0244324 A1* | 8/2019 | Watanabe ............... G09G 5/377 |
| 2019/0387219 A1 | 12/2019 | Kondo et al. |
| 2020/0031281 A1 | 1/2020 | Watanabe et al. |
| 2020/0031283 A1 | 1/2020 | Nakasho et al. |

FOREIGN PATENT DOCUMENTS

| | | |
|---|---|---|
| JP | 2018-56953 A | 4/2018 |
| JP | 2018-152738 A | 9/2018 |
| WO | 2016/031009 A1 | 3/2016 |
| WO | 2018/061294 A1 | 4/2018 |

* cited by examiner

SYSTEM AND METHOD FOR WORK MACHINE

CROSS-REFERENCE TO RELATED APPLICATIONS

This application is a U.S. National stage application of International Application No. PCT/JP2020/001721, filed on Jan. 20, 2020. This U.S. National stage application claims priority under 35 U.S.C. § 119(a) to Japanese Patent Application No. 2019-008905, filed in Japan on Jan. 23, 2019, the entire contents of which are hereby incorporated herein by reference.

BACKGROUND

Field of the Invention

The present disclosure relates to a system and a method for a work machine.

Background Information

A system which displays an image indicating a work machine and the surroundings thereof is known in the prior art. For example, in International Publication No. WO 2016-031009, a system includes a plurality of cameras attached to a work machine, and a controller. The plurality of cameras capture images of the surroundings of the work machine. The controller synthesizes a bird's-eye view image which indicates the surroundings of the work machine from the images captured by the plurality of cameras.

SUMMARY

An operator is able to check the surroundings of the work machine by viewing the above image on a display. In this case, work efficiency can be further improved if the operator is able to accurately ascertain the positional relationship between the work machine and the surroundings thereof. For example, work such as excavating can be efficiently performed if the operator can accurately ascertain the positional relationship between the work machine and topography in front of the work machine.

An object of the present disclosure is to allow an operator to accurately ascertain a positional relationship between a work machine and the surroundings thereof with an image.

A system according to a first aspect includes a work machine, a camera, a sensor, a processor, and a display. The work machine includes a vehicle body and a work implement attached to the vehicle body. The camera captures a surroundings image in the traveling direction of the work machine. The sensor measures a shape of the surroundings in a traveling direction of the work machine. The processor acquires image data indicative of the surroundings image. The processor acquires shape data indicative of the shape of the surroundings in the traveling direction of the work machine. The processor generates a guide line. The guide line is disposed spaced away from the work machine. The guide line indicates the shape of the surroundings in the traveling direction of the work machine. The processor synthesizes the surroundings image and the guide line and generates an image including the surroundings image and the guide line. The display displays the image including the surroundings image and the guide line based on a signal from the processor.

A method according to a second aspect is a method executed by a processor for displaying surroundings of a work machine on a display. The work machine includes a vehicle body and a work implement attached to the vehicle body. The method includes the following processes. A first process is acquiring image data indicative of a surroundings image in a traveling direction of the work machine. A second process is acquiring shape data indicative of a shape of the surroundings in the traveling direction of the work machine. A third process is generating a guide line. The guide line is arranged spaced away from the work machine. The guide line indicates the shape of the surroundings in the traveling direction of the work machine. A fourth process is synthesizing the surroundings image and the guide line and generating an image including the surroundings image and the guide line. A fifth process is displaying the image including the surroundings image and the guide line on the display.

A system according to a third aspect includes a processor and a display. The processor acquires image data indicative of a surroundings image in a traveling direction of a work machine. The processor acquires shape data indicative of a shape of the surroundings in the traveling direction of the work machine. The processor generates a guide line. The guide line is arranged spaced away from the work machine. The guide line indicates the shape of the surroundings in the traveling direction of the work machine. The processor synthesizes the surroundings image and the guide line and generates an image including the surroundings image and the guide line. The display displays the image including the surroundings image and the guide line based on a signal from the processor.

According to the present disclosure, an operator is able to accurately ascertain the positional relationship between the work machine and the surroundings thereof with an image.

DETAILED DESCRIPTION OF EMBODIMENT(S)

Figure 1:
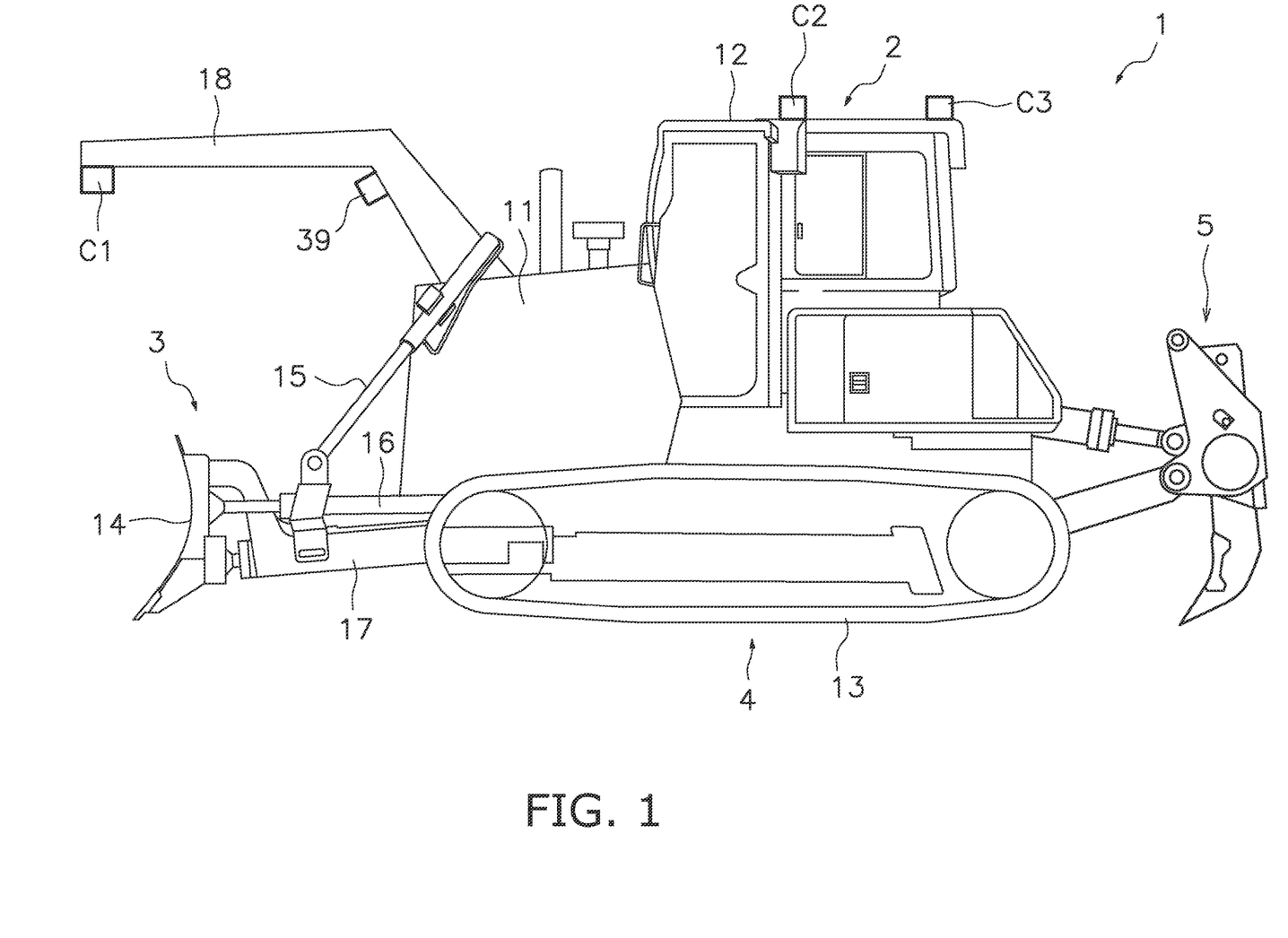
FIG. 1 is a side view of a work machine according to an embodiment.

The following is a description of a system for a work machine according to an embodiment with reference to the drawings. FIG. 1 is a side view of a work machine 1 according to the embodiment. The work machine 1 is a bulldozer according to the present embodiment. The work machine 1 is provided with a vehicle body 2, a work implement 3, and a travel device 4. In the following explanation, the direction in which the work implement 3 is disposed on the vehicle body 2 is defined as forward and the opposite direction is defined as rearward. The left and right are defined as the left and right directions when looking forward from the vehicle body 2.

The vehicle body 2 includes an engine compartment 11. An operating cabin 12 is disposed behind the engine compartment 11. A ripper device 5 is attached to a rear part of the vehicle body 2. The travel device 4 is a device for causing the work machine 1 to travel. The travel device 4 has a pair of crawler belts 13. The crawler belts 13 are disposed on the left and right sides of the vehicle body 2. The work machine 1 travels due to the crawler belts 13 being driven.

The work implement 3 is disposed in front of the vehicle body 2. The work implement 3 is used for work such as excavating, earth moving, or ground leveling. The work implement 3 has a blade 14, a lift cylinder 15, a tilt cylinder 16, and an arm 17. The blade 14 is attached to the vehicle body 2 via the arm 17. The blade 14 is configured to move in the up-down direction. The lift cylinder 15 and the tilt cylinder 16 are driven by hydraulic fluid discharged from a belowmentioned hydraulic pump 22 and change the attitude of the blade 14.

Figure 2:
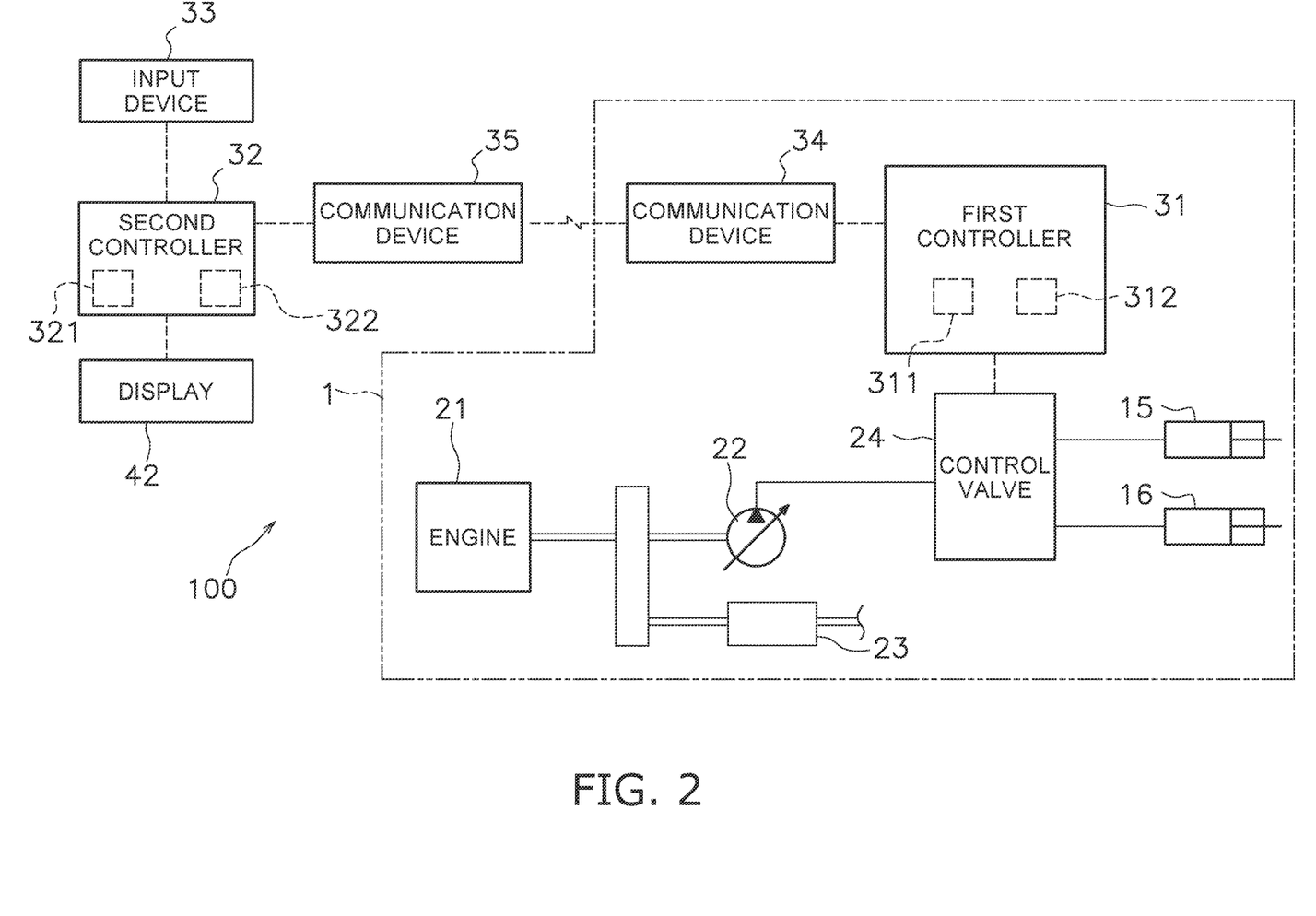
FIG. 2 illustrates a configuration of a system according to the embodiment.

FIG. 2 is a block diagram of a configuration of a system 100 for controlling the work machine 1. As illustrated in FIG. 2, the work machine 1 includes an engine 21, the hydraulic pump 22, a power transmission device 23, and a control valve 24. The engine 21, the hydraulic pump 22, and the power transmission device 23 are disposed in the engine compartment 11. The hydraulic pump 22 is driven by the engine 21 to discharge the hydraulic fluid. The hydraulic fluid discharged from the hydraulic pump 22 is supplied to the lift cylinder 15 and the tilt cylinder 16. While only one hydraulic pump 22 is illustrated in FIG. 2, a plurality of hydraulic pumps may be provided.

The power transmission device 23 transmits the driving power of the engine 21 to the travel device 4. The power transmission device 23 may be a hydrostatic transmission (HST), for example. Alternatively, the power transmission device 23 may be, for example, a transmission having a torque converter or a plurality of speed change gears.

The control valve 24 is a proportional control valve and is controlled in accordance with an input instruction signal. The control valve 29 is disposed between hydraulic actuators and the hydraulic pump 22. The hydraulic actuators include the lift cylinder 15 and the tilt cylinder 16. The control valve 24 controls the flow rate of the hydraulic fluid supplied from the hydraulic pump 22 to the lift cylinder 15 and the tilt cylinder 16. The control valve 24 may also be a pressure proportional control valve. Alternatively, the control valve 24 may be an electromagnetic proportional control valve.

The system 100 includes a first controller 31, a second controller 32, an input device 33, and communication devices 34 and 35. The first controller 31 and the communication device 34 are mounted to the work machine 1. The second controller 32, the input device 33, and the communication device 35 are disposed outside of the work machine 1. For example, the second controller 32, the input device 33, and the communication device 35 may be disposed inside a control center separate from the work site. The work machine 1 can be operated remotely through the input device 33.

The first controller 31 and the second controller 32 are programmed to control the work machine 1. The controller 31 includes a memory 311 and a processor 312. The memory 311 includes, for example, a volatile memory such as a RAM and a non-volatile memory such as a ROM. The memory 311 stores programs and data for controlling the work machine 1. The processor 312 is, for example, a central processing unit (CPU) and executes processes for controlling the work machine 1 according to a program. The first controller 31 controls the travel device 4 or the power transmission device 23 thereby causing the work machine 1 to travel. The first controller 31 causes the work implement 3 to move by controlling the control valve 24.

The second controller 32 includes a memory 321 and a processor 322. The memory 321 includes, for example, a volatile memory such as a RAM and a non-volatile memory such as a ROM. The memory 321 stores programs and data for controlling the work machine 1. The processor 322 is, for example, a central processing unit (CPU) and executes processes for controlling the work machine 1 according to a program. The second controller 32 receives operation signals from the input device 33.

The input device 33 receives operations by an operator and outputs operation signals corresponding to the operations. The input device 33 outputs the operation signals to the second controller 32. The input device 33 includes operation pieces such as an operating lever, a pedal, or a switch for operating the travel device 4 and the work implement 3. The input device 33 may include a touch panel. The travel of the work machine 1 such as forward travel or reverse travel is controlled in accordance with the operation of the input device 33. In addition, operation of the work implement 3 such as raising or lowering is controlled in accordance with the operation of the input device 33.

The second controller 32 is configured to communicate wirelessly with the first controller 31 via the communication devices 34 and 35. The second controller 32 acquires operation data from the operation signals from the input device 33 and transmits the operation data to the first controller 31. The operation data represents operations of the input device 33 for operating the travel device 4 and the work implement 3. The first controller 31 controls the travel device 4 and the work implement 3 in accordance with the operation data.

Figure 3:
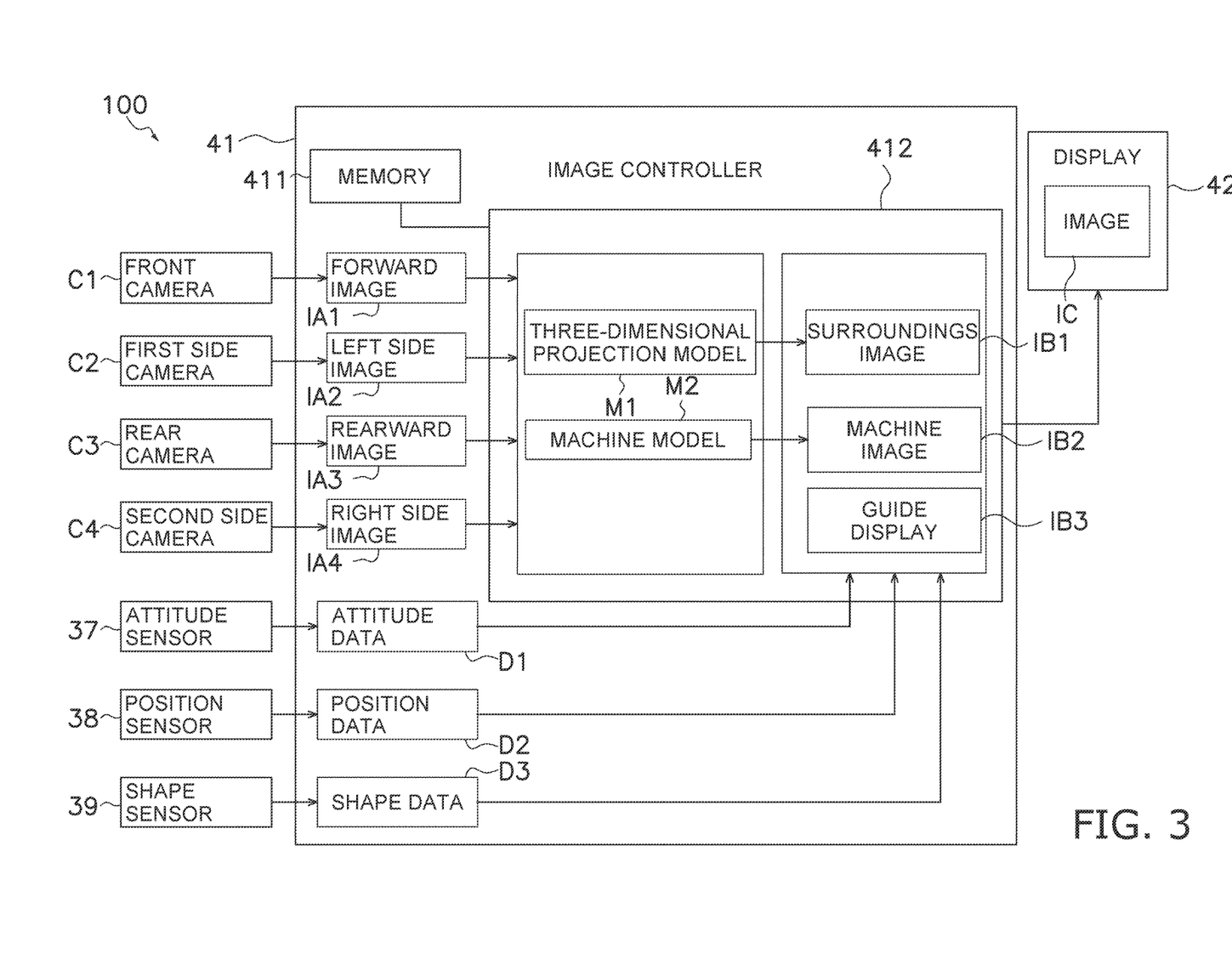
FIG. 3 is a block diagram illustrating a configuration of the system and a processing flow performed by the system.

FIG. 3 is a block diagram illustrating a configuration of the system 100 for displaying an image of the work machine 1 and the surroundings thereof, and illustrating a processing flow performed by the system. As illustrated in FIG. 3, the system 100 includes a plurality of cameras C1 to C4. The plurality of cameras C1 to C4 are attached to the vehicle body 2.

The plurality of cameras C1 to C4 are fish-eye lens cameras. The angle of view of each of the plurality of cameras C1 to C4 is 180 degrees. However, the angle of view of each of the plurality of cameras C1 to C4 may be less than 180 degrees. Alternatively, the angle of view of each of the plurality of cameras C1 to C4 may be greater than 180 degrees. The plurality of cameras C1 to C4 includes a front camera C1, a first side camera C2, a rear camera C3, and a second side camera C4.

As illustrated in FIG. 1, the front camera C1 is attached to a front part of the vehicle body 2. Specifically, the vehicle body 2 includes a supporting member 18 as illustrated in FIG. 1. The supporting member 18 extends upward and forward from the front part of the vehicle body 2. The front camera C1 is attached to the supporting member 18. The rear camera C3 is attached to a rear part of the vehicle body 2.

The first side camera C2 is attached to one side part of the vehicle body 2. The second side camera C4 is attached to the other side part of the vehicle body 2. In the present embodiment, the first side camera C2 is attached to a left side part of the vehicle body 2 and the second side camera C4 is attached to a right side part of the vehicle body 2. However, the first side camera C2 may be attached the right side part of the vehicle body 2, and the second side camera C4 may be attached the left side part of the vehicle body 2.

The front camera C1 acquires images in front of the vehicle body 2. The rear camera C3 acquires images to the rear of the work machine 1. The first side camera C2 acquires images on the left side of the vehicle body 2. The second side camera C4 acquires images on the right side of the vehicle body 2. The cameras C1 to C4 output image data indicative of the acquired images.

The system 100 includes an attitude sensor 37, a positional sensor 38, and a shape sensor 39. The attitude sensor 37 detects the attitude of the work machine 1 and outputs attitude data D1 indicative of the attitude. The attitude sensor 37 is, for example, an inertial measurement unit (IMU). The attitude data D1 includes the angle (pitch angle) relative to horizontal in the vehicle front-back direction and the angle (roll angle) relative to horizontal in the vehicle lateral direction. The attitude sensor 37 outputs the attitude data D1.

The positional sensor 38 includes, for example, a global navigation satellite system (GNSS) receiver such as a global positioning system (GPS) or the like. The positional sensor 38 receives positioning signals from a satellite. The positional sensor 38 acquires position data D2 from the positioning signal. The position data D2 represents the positional coordinates of the work machine 1. The positional sensor 38 outputs the position data D2.

The shape sensor 39 measures the shape of the surroundings of the work machine 1. The shape sensor 39 outputs shape data D3 indicative of the shape of the surroundings of the work machine 1. The shape sensor 39 is, for example, attached to the supporting member 18. The shape sensor 39 measures the shape in front of the work machine 1. The shape sensor 39 is, for example, a light detection and ranging (LIDAR) device.

The system 100 includes an image controller 41 and a display 42. The image controller 41 is programmed to generate an image IC which depicts the work machine 1 and the surroundings thereof and to display the image IC on the display 42. The image controller 41 includes a memory 411 and a processor 412. The memory 411 includes, for example, a volatile memory such as a RAM and a non-volatile memory such as a ROM. The memory 411 stores programs and data for generating the image IC. The processor 412 id a central processing unit (CPU) for example. The processor 412 executes processes for generating the image IC and displaying the image IC on the display 42 in accordance with a program.

The image controller 41 is communicably connected to the first controller 31 by wire or wirelessly. The image controller 41 is communicably connected to the second controller 32 by wire or wirelessly. The image controller 41 may be mounted to the work machine 1. The image controller 41 may be integrated with the first controller 31 or may be a separate item.

Alternatively, the image controller 41 may be disposed outside the work machine 1. For example, the image controller 41 may be disposed inside the control center. The image controller 41 may be integrated with the second controller 32 or may be a separate item.

The image controller 41 is communicably connected to the cameras C1 to C4 by wire or wirelessly. The image controller 41 receives the image data from the cameras C1 to C4. Alternatively, the image controller 41 may receive the image data through the first controller 31 and/or the second controller 32.

The image controller 41 is communicably connected to the attitude sensor 37, the positional sensor 38, and the shape sensor 39 by wire or wirelessly. The image controller 41 receives the attitude data D1 from the attitude sensor 37. The image controller 41 receives the position data D2 from the positional sensor 38. The image controller 41 receives the shape data D3 from the shape sensor 39. Alternatively, the image controller 41 may receive the attitude data D1, the position data D2, and the shape data D3 through the first controller 31 and/or the second controller 32.

The display 142 is a device such as a CRT, and LCD, or an OELD. However, the display 42 is not limited to the aforementioned displays and may be another type of display. The display 42 displays images based on signals from the image controller 41. The display 42 may receive the signals from the image controller 41 through the first controller 31 and/or the second controller 32.

Figure 4:
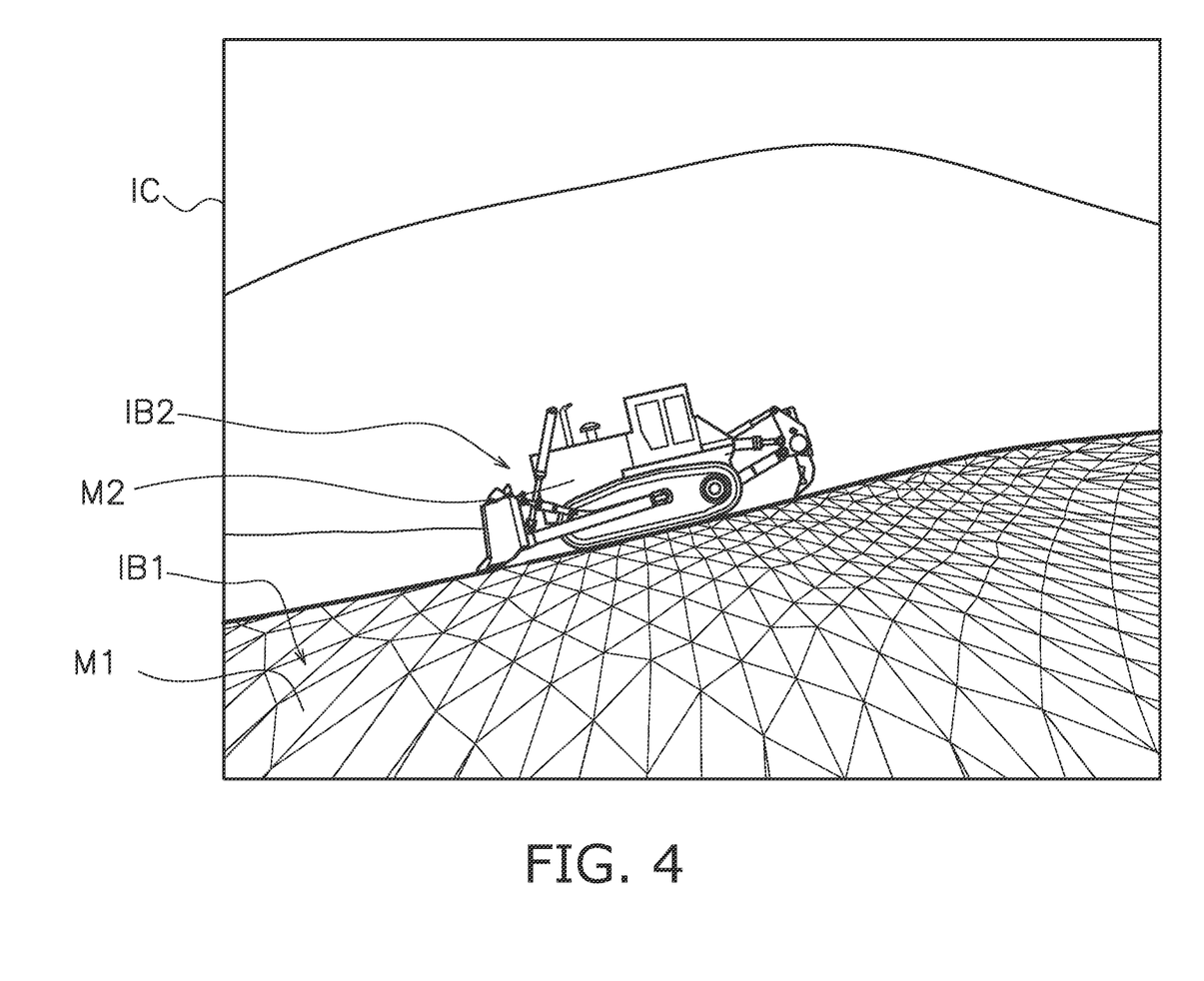
FIG. 4 illustrates an example of an image displayed on a display.

The image controller 41 generates the image IC based on the abovementioned image data, the attitude data D1, the position data D2, and the shape data D3. FIG. 4 illustrates an example of the image IC. The image IC includes the work machine 1 and the surroundings thereof. The following is an explanation of the generation of the image IC.

First, the cameras C1 to C4 capture images of the work machine 1 and the surroundings thereof. Consequently, the image controller 41 acquires a forward image IA1, a left side image IA2, a rearward image IA3, and a right side image IA4 from the cameras C1 to C4 as illustrated in FIG. 3. The forward image IA1 is an image in front of the vehicle body 2. The left side image IA2 is an image to the left of the vehicle body 2. The rearward image IA3 is an image behind the vehicle body 2. The right side image IA4 is an image to the right of the vehicle body 2.

The image controller 41 generates a surroundings image IB1 from the images IA1 to IA4 acquired by the cameras C1 to C4. The surroundings image IB1 is a composite image which depicts the surroundings of the work machine 1 from a bird's-eye view. The image controller 41 generates the surroundings image IB1 by projecting the images IA1 to IA4 acquired by the cameras C1 to C4 onto a three-dimensional projection model M1 by texture mapping as illustrated in FIG. 4. The three-dimensional projection model M1 is configured with a polygon mesh indicative of the shape of surroundings of the work machine 1. The image controller 41 may use a previously saved three-dimensional projection model M1. Alternatively, the image controller 41 may generate the three-dimensional projection model M1 based on the shape data D3.

Next, the image controller 41 synthesizes a machine image IB2 which depicts the work machine 1 with the surroundings image IB1. The machine image IB2 is an image which depicts the work machine 1 itself in a three-dimensional manner. The image controller 41 determines the attitude and heading of the machine image IB2 on the image IC from the attitude data D1. The image controller 41 determines the position of the machine image IB2 on the image IC from the position data D2. The image controller 41 synthesizes the machine image IB2 with the image IC so that the attitude, heading, and position of the machine image IB2 on the image IC matches the actual attitude, heading, and position of the work machine 1.

The image controller 41 may generate the machine image IB2 from the images IA1 to IA4 acquired by the cameras C1 to C4. For example, portions of the work machine 1 are included in the images acquired by the cameras C1 to C4, and the image controller 41 may generate the machine image IB2 by projecting the portions in the images onto a machine model M2. Alternatively, the machine model M2 may be a projection model having the shape of the work machine 1 and may be saved in the memory 411. The machine image IB2 may be a previously captured image or may be a previously created three-dimensional computer graphic. A portion of the configuration of the work machine 1 such as the supporting member 18 may be omitted from the machine image IB2.

The display 42 displays the image IC. The image IC is updated in real time and is displayed as a video on the display 42. Therefore, when the work machine 1 is traveling, the surroundings images IB1 in the image IC are changed and displayed in real time in accordance with the actual changes of the surroundings of the work machine 1. Moreover, when the work machine 1 is traveling, the attitude, heading, and position of the machine image IB2 are changed and displayed in real time in accordance with the actual changes in the attitude, heading and position of the work machine 1.

The method described in "Spatio-temporal bird's-eye view images using multiple fish-eye cameras," (Proceedings of the 2013 IEEE/SICE International Symposium on System Integration, pp. 753-758, 2013) for example, may be used as a specific method for synthesizing the images. The method described in "Visualization of the surrounding environment and operational part in a 3DCG model for the teleoperation of construction machines," (Proceedings of the 2015 IEEE/SICE International Symposium on System Integration, pp. 81-87, 2015) may also be used.

In FIG. 4, the image IC is an image of the work machine 1 and the surroundings thereof as seen from the left side. However, the image controller 41 is configured to switch the image IC to an image of the work machine 1 and the surroundings thereof as seen from a viewpoint in front, in the rear, on the right side, or above, or from an oblique viewpoint from any of the directions.

Figure 5:
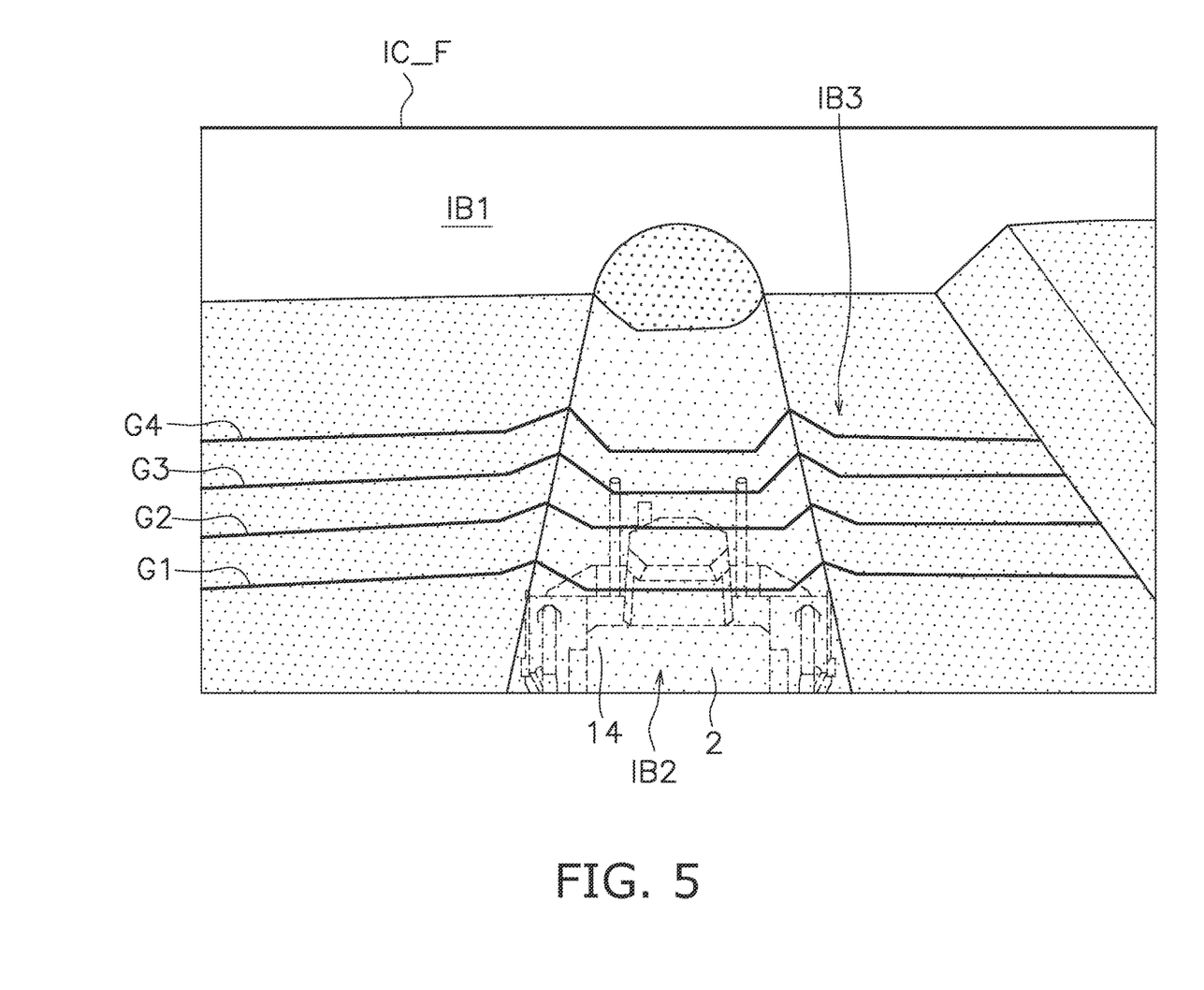
FIG. 5 illustrates an example of an image during excavation.

The image controller 41 generates an image IC_F illustrated in FIG. 5 and causes the image IC_F to be displayed on the display 42 during excavation. The image controller 41 may automatically determine that the work machine 1 is excavating. For example, the image controller 41 may determine that the work machine 1 is excavating based on an operation signal from the input device 33. Alternatively, the image controller 41 may cause the image IC_F to be displayed by the display 42 due to the operation of the input device 33 by the operator.

The image IC_F during excavation illustrated in FIG. 5 is an image from a viewpoint behind and above the work machine 1. The image IC_F depicts the work machine 1 and the surroundings of the work machine 1. The image controller 41 determines the viewpoint and the position of the work machine 1 so that the area in front of the work machine 1 is larger than the area behind the work machine 1 in the image IC_F. The machine image IB2 is displayed in the image IC_F so that the width of the blade 14 is approximately ⅓ the width of the image IC_F. However, the size of the machine image IB2 in the image IC_F is not limited thereto and may be modified.

The image IC_F also includes a guide display IB3. The image controller 41 synthesizes the guide display IB3 and the abovementioned surroundings image IB1 and the machine image IB2, to generate the image IC_F. The machine image IB2 is a transparent image. That is, a portion of the surroundings image IB1 that overlaps the machine image IB2 can be seen through the machine image IB2. For example, the machine image IB2 may be a skeleton image. Alternatively, the machine image IB2 may not be a completely transparent image and may be an image having high transparency.

The guide display IB3 includes a plurality of guide lines G1 to G4. The plurality of guide lines G1 to G4 are disposed spaced away from each other in front of the work machine 1. The plurality of guide lines G1 to G4 are disposed in equal intervals in front of the work implement 3. For example, the plurality of guide lines G1 to G4 are disposed in intervals of 1 m or 1 ft in front of the work implement 3. The intervals of the plurality of guide lines G1 to G4 may be changeable due to the operator operating the input device 33.

The guide line G1 is the closest to the work machine 1 among the plurality of guide lines G1 to G4. The position of the guide line G1 is determined based on the position of the work implement 3. For example, the guide line G1 is displayed in a position in front of the blade 14 by a predetermined distance. The guide line G1 may be displayed in a position in front of a lower end part of the blade 14 by a predetermined distance. Alternatively, the guide line G1 may be displayed in a position on the blade 14

Each of the plurality of guide lines G1 to G4 extend in the vehicle width direction of the work machine 1. The plurality of guide lines G1 to G4 indicate the shape of the surroundings of the work machine 1. Each of the plurality of guide lines G1 to G4 correspond to a contour line which indicates an elevation difference on the surface of the surroundings of the work machine 1. Each of the plurality of guide lines G1 to G4 has a shape that follows the surface of the surroundings of the work machine 1. For example, when the surface of the surroundings of the work machine 1 has an uneven shape, each of the plurality of guide lines G1 to G4 takes on an uneven shape that follows the surface of the surroundings of the work machine 1. Alternatively, when the surface of the surroundings of the work machine 1 has a linear shape, each of the plurality of guide lines G1 to G4 takes on a linear shape that follows the surface of the surroundings of the work machine 1.

In the system 100 according to the present embodiment explained above, the guide display IB3 including the plurality of guide lines G1 to G4 is displayed in the image IC_F. As a result, the operator is able to accurately ascertain the topography in front of the work machine 1 and the positional relationship between the work machine 1 and the topography. Accordingly, efficiency for work such as excavating can be improved.

The plurality of guide lines G1 to G4 are disposed in equal intervals. As a result, the operator is able to easily ascertain a feeling of distance in front of the work machine 1.

While an embodiment of the present disclosure has been described above, the present invention is not limited to the embodiment and the following modifications may be made within the scope of the present invention. For example, the work machine is not limited to a bulldozer and may be another type of work machine such as a wheel loader or a hydraulic excavator.

Figure 6:
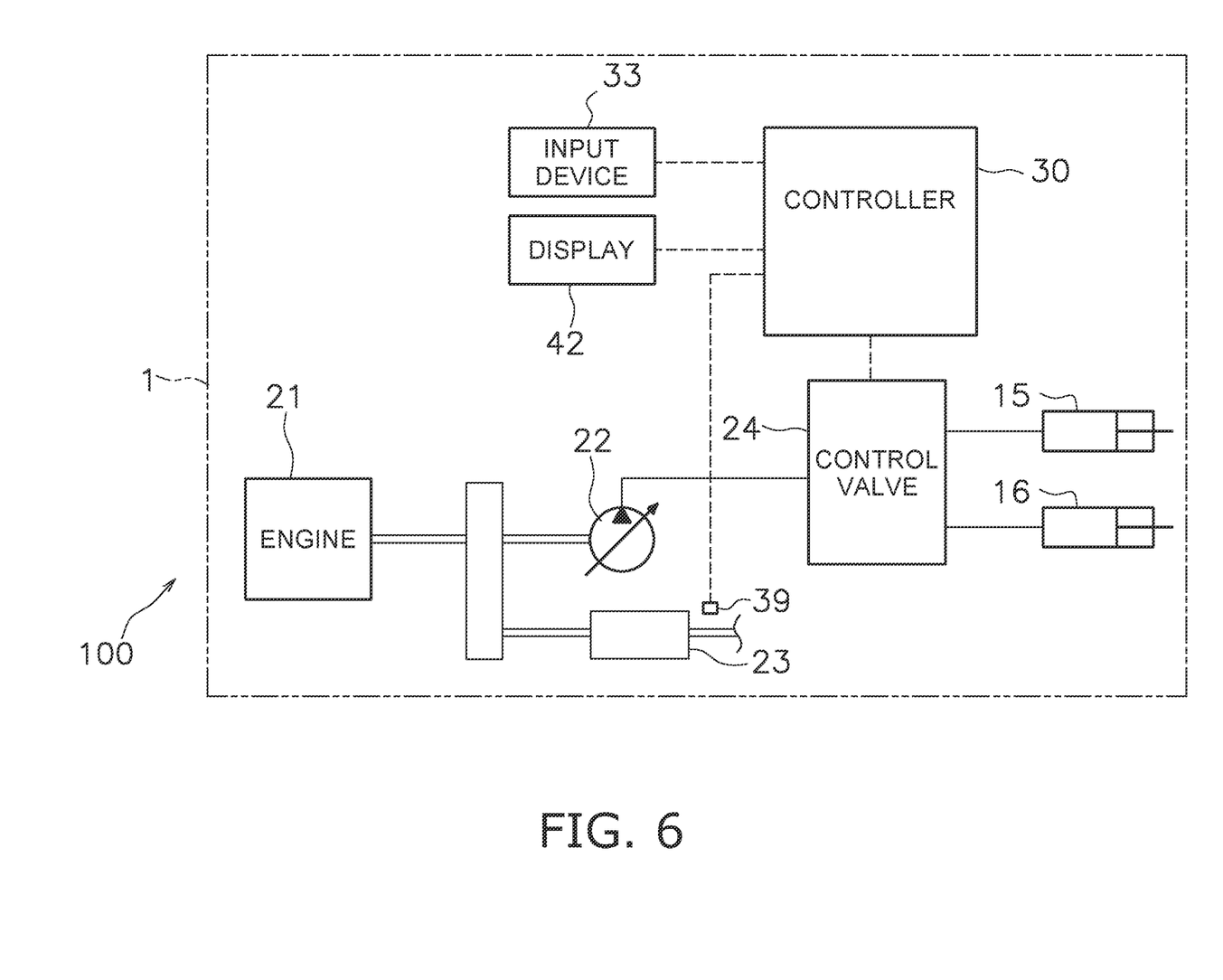
FIG. 6 illustrates a configuration of the system according to a modified example.

The work machine 1 may be operated from inside the operating cabin and not remotely. FIG. 6 illustrates a configuration of the work machine 1 according to a modified example. As illustrated in FIG. 6, the work machine 1 may include a controller 30 mounted to the work machine 1. The controller 30 has the same configuration as the abovementioned first controller 31 or the second controller 32 and therefore a detailed explanation will be omitted. In this case, the input device 33 may be disposed inside the operating cabin.

The first controller 31 is not limited to one unit and may be divided into a plurality of controllers. The second controller 32 is not limited to one unit and may be divided into a plurality of controllers. The controller 30 is not limited to one unit and may be divided into a plurality of controllers. A portion or all of the abovementioned processes for generating the images IC may be executed by another controller instead of the image controller 41.

The number of the cameras is not limited to four and may be three or less or five or more. The cameras are not limited to fish-eye lens cameras and may be a different type of camera. The dispositions of the cameras are not limited to the dispositions indicated in the above embodiment and may be disposed differently. The attitude sensor 37 is not limited to an IMU and may be another type of sensor. The positional sensor 38 is not limited to a GNSS receiver and may be another type of sensor. The shape sensor 39 is not limited to a LIDAR device and may be another device such as a stereo camera.

The image IC_F during excavation is not limited to the image of the above embodiment and may be changed. For example, the machine image IB2 may not be transparent in the image IC_F during excavating work. The image IC_F during excavation may be an image from a viewpoint different from the abovementioned viewpoint. For example, the image IC_F during excavation may be an image from a viewpoint in front and above the work machine 1. Alternatively, the image IC_F during excavation may be an image from a viewpoint to the side of the work machine 1. In this case, the plurality of guide lines G1 to G4 may be disposed spaced away from each other in front of the work machine 1 using the work machine 1 as a reference.

The number of guide lines is four in the above embodiment. However, the number of the guide lines may be less than four of greater than four. The number of guide lines may be one. The guide display may be displayed in an image other than during excavation. For example, the guide display may be displayed in an image during forward travel of the work machine 1. In this case, the plurality of guide lines G1 to G4 may be displayed in front of the work machine 1 in the same way as illustrated in FIG. 5.

Figure 7:
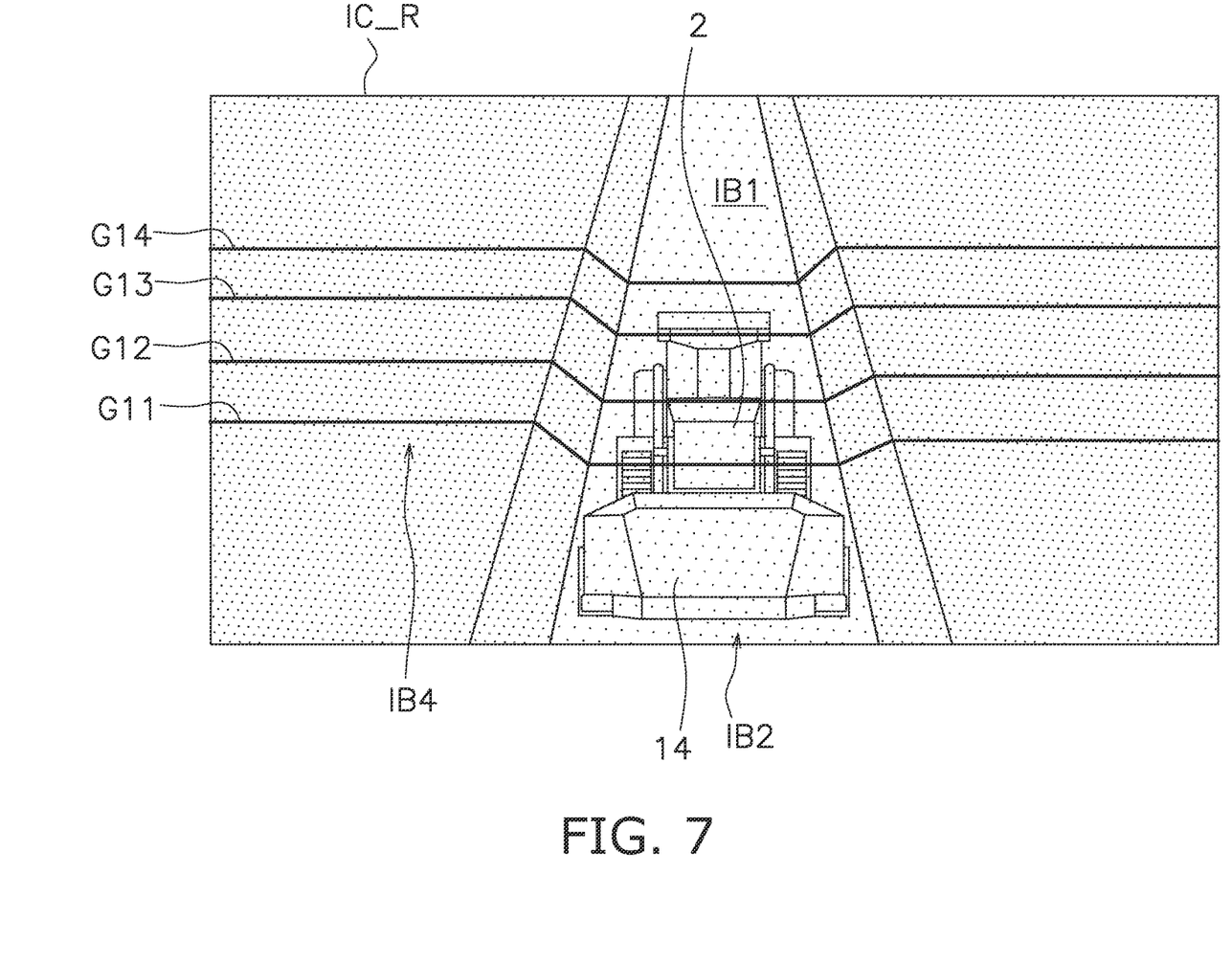
FIG. 7 illustrates an example of an image during reverse travel.

Alternatively, the guide display may be displayed in an image during reverse travel of the work machine 1. For example, the image controller 41 may generate an image IC_R illustrated in FIG. 7 during reverse travel of the work machine 1, and may cause the image IC_R to be displayed on the display 42. The image IC_R during reverse travel illustrated in FIG. 7 is an image from a viewpoint to the front and above the work machine 1. The image IC_R during reverse travel depicts the work machine 1 and the surroundings of the work machine 1. The image controller 41 determines the viewpoint and the position of the work machine 1 so that the area behind the work machine 1 is larger than the area in front of the work machine 1 in the image IC_R during reverse travel.

The image IC_R during reverse travel includes a guide display IB4. The image controller 41 synthesizes the guide display IB4 and the abovementioned surroundings image IB1 and the machine image IB2, to generate the image IC_R. The guide display IB4 includes a plurality of guide lines G11 to G14. The plurality of guide lines G11 to G14 are disposed spaced away from each other behind the work machine 1. The plurality of guide lines G11 to G14 are the same as the abovementioned plurality of guide lines G1 to G4. In this case, the operator is able to accurately ascertain the topography behind the work machine 1 and the positional relationship between the work machine 1 and the topography.

Alternatively, the plurality of guide lines may be disposed spaced away from each other in the vehicle width direction of the work machine 1. In this case, the plurality of guide lines may extend in the front-back direction of the work machine 1. The plurality of guide lines may be disposed spaced away from each other to the left of the work machine 1. The plurality of guide lines may be disposed spaced away from each other to the right of the work machine 1.

According to the present disclosure, an operator is able to accurately ascertain the positional relationship between the work machine and the surroundings thereof with an image.

The invention claimed is:

1. A system comprising:
a work machine including a vehicle body and a work implement attached to the vehicle body, the work implement including a blade;
a camera that captures a surrounding image in a traveling direction of the work machine;
a sensor that measures a shape of surroundings in the traveling direction of the work machine;
a processor configured to
acquire image data indicative of the surroundings image,
acquire shape data indicative of the shape of the surroundings in the traveling direction of the work machine,
generate a guide line that is disposed spaced away from the work machine and indicates the shape of the surroundings in the traveling direction of the work machine, a position of the guide line being determined based on a position of the blade such that the guide line is located a predetermined distance from the blade,
synthesize the surroundings image and the guide line, and
generate an image including the surroundings image and the guide line; and
a display that displays the image including the surroundings image and the guide line based on a signal from the processor.

2. The system according to claim 1, wherein the guide line indicates a shape of a surface of the surroundings of the work machine.

3. The system according to claim 1, wherein the guide line indicates an elevation difference of a surface of the surroundings of the work machine.

4. The system according to claim 1, wherein the position of the blade is a position of a lower end part of the blade, and the predetermined distance is measured from the lower end part of the blade.

5. The work machine according to claim 1, wherein the surroundings image is an image from a viewpoint behind and above the work machine.

6. The system according to claim 1, wherein the processor is further configured to
generate a plurality of the guide lines disposed spaced from each other in the traveling direction of the work machine, and
generate the image including the surroundings image and the plurality of guide lines.

7. The system according to claim 6, wherein the plurality of guide lines are disposed at equal intervals along the traveling direction of the work machine.

8. The system according to claim 1, wherein the processor is further configured to
synthesize a machine image indicative of the work machine, with the surroundings image and the guide line,
generate an image including the surroundings image, the guide line, and the machine image, and
cause the image to be displayed on the display.

9. The system according to claim 8, wherein the machine image is a transparent image.

10. The system according to claim 1, wherein
the guide line is generated to extend in a widthwise direction of the work machine perpendicular to the traveling direction, and
the predetermined distance is a distance from the blade in the traveling direction.

11. A method executed by a processor for displaying, on a display, the surroundings of a work machine including a vehicle body and a work implement attached to the vehicle body, the work implement including a blade, the method comprising:
acquiring image data indicative of a surroundings image in a traveling direction of the work machine;
acquiring shape data indicative of a shape of the surroundings in the traveling direction of the work machine;
generating a guide line that is disposed spaced from the work machine and indicates the shape of the surroundings in the traveling direction of the work machine, a position of the guide line being determined based on a position of the blade such that the guide line is located a predetermined distance from the blade;
synthesizing the surroundings image and the guide line and generating an image including the surroundings image and the guide line; and
displaying the image including the surroundings image and the guide line on the display.

12. The method according to claim 11, wherein
the guide line indicates a shape of a surface of the surroundings of the work machine.

13. The method as in claim 11, wherein
the guide line indicates an elevation difference of a surface of the surroundings of the work machine.

14. The method according to claim 11, wherein
the position of the blade is a position of a lower end part of the blade, and
the predetermined distance is measured from the lower end part of the blade.

15. The method according to claim 11, wherein
the surroundings image is an image from a viewpoint behind and above the work machine.

16. The method according to claim 11, further comprising:
generating a plurality of the guide lines disposed spaced from each other in the traveling direction of the work machine,
synthesizing the surroundings image and the plurality of guide lines and generating an image including the surroundings image and the plurality of guide lines; and
displaying the image including the surroundings image and the plurality of guide lines on the display.

17. The method according to claim 16, wherein
the plurality of guide lines are disposed at equal intervals along the traveling direction of the work machine.

18. The method according to claim 11, further comprising:
synthesizing a machine image indicative of the work machine, with the surroundings image and the guide line,
generating an image including the surroundings image, the guide line, and the machine image, and
causing the image to be displayed on the display.

19. A system comprising:
a processor configured to
acquire image data indicative of a surroundings image in a traveling direction of a work machine including a vehicle body and a work implement attached to the vehicle body, the work implement including a blade,
acquire shape data indicative of surroundings in a traveling direction of the work machine,
generate a guide line that is disposed spaced from the work machine and indicates a shape of the surroundings in the traveling direction of the work machine, a position of the guide line being determined based on a position of the blade such that the guide line is located a predetermined distance from the blade,
synthesize the surroundings image and the guide line, and
generate an image including the surroundings image and the guide line; and
a display that displays the image including the surroundings image and the guide line based on a signal from the processor.

20. The system according to claim 19, wherein
the position of the blade is a position of a lower end part of the blade, and
the predetermined distance is measured from the lower end part of the blade.

* * * * *